United States Patent Office 3,111,500
Patented Nov. 19, 1963

3,111,500
PROCESS COMPRISING HEATING A MIXTURE OF AN ETHYLENE-VINYL ACETATE COPOLYMER, CATALYST AND A CROSS-LINKING MONOMER
Herbert Bartl, Cologne-Stammheim, and Julius Peter, Odenthal, Bergisch, Gladbach, Germany, assignors to Farbenfabriken Bayer Aktiengesellschaft, Leverkusen, Germany, a corporation of Germany
No Drawing. Filed Jan. 27, 1959, Ser. No. 789,236
Claims priority, application Germany Jan. 30, 1958
8 Claims. (Cl. 260—41)

The present invention relates to a process of producing rubber-like polymers and more particularly to the cross-linking of copolymers of ethylene by means of radical forming substances.

The conversion of polyethylene into cross-linked plastics by the use of organic peroxides is known. However, the degree of cross-linking thus produced in small, so that the solubility and softening point of the material are only slightly altered. Moreover, such a cross-linked polyethylene does not have the character of an elastomeric material.

It has now been found that cross-linked ethylene polymers, which also have the properties of a vulcanised rubber, are obtained if normally solid linear copolymers of ethylene and monoethylenically unsaturated compounds which contain at least one carbon atom having bonded thereto a single hydrogen atom are transformed into cross-linked products by means of free radical-forming substances, and preferably organic peroxides, at elevated temperatures.

By monoethylenically unsaturated monomers containing at least one carbon atom having bonded thereto a single hydrogen atom are to be understood, for example, esters of acrylic acid with saturated monohydric alcohols having 1 to 8 carbon atoms (such as methanol, ethanol, propanol, butanol, cyclohexanol), acrylamide, acrylonitrile, acrylic acid, esters and half esters of alpha-beta-monoethylenically unsaturated dicarboxylic acids such as fumaric acid, maleic acid with saturated monohydric alcohols having 1 to 8 carbon atoms, monovinylaromatic compounds such as styrene, vinyl chloride and methacrylic acid esters of secondary monohydric saturated alcohols such as isopropanol, furthermore maleic acid anhydride. These copolymers can be produced by processes known per se. Vulcanisation products having particularly good mechanical properties are, however, produced if copolymers of ethylene and organic vinyl esters are used, which esters are advantageously produced by polymerization in a liquid phase containing predominantly tertiary butanol, as indicated in Italian Patent 584,212. Examples of vinyl esters which can be copolymerised with ethylene are: vinyl chloracetate, vinyl formate, vinyl benzoate and most advantageously, vinyl acetate and vinyl propionate. Further suitable copolymers are those of ethylene and propylene. The content of the copolymerization components such as the vinyl esters incorporated by polymerization into the copolymers should be 10–60 percent by weight, and most advantageously 20–50 percent by weight.

As free-radical formers which decompose at elevated temperature, it is possible to use persulphates, perborates, readily decomposable azo compounds, such for example as azodiisobutyro nitrile, azodicarboxylic acid esters, or peroxides, such as benzoyl peroxide, dichlorobenzoyl peroxide, tertiary butyl hydroperoxide, peroxy dicarbonates, cyclohexanone peroxide, tertiary butyl perbenzoate, polyfunctional peroxides, such for example as polymeric phthalyl peroxide or adipic acid-bis-tertiary butyl perester or polyacrylic acid-tertiary butyl perester. However, peroxides which have such a low decomposition velocity at temperatures below 100° C. that they do not produce any cross-linking on being incorporated into the polymers, but decompose rapidly at higher temperatures up to 250° C., are particularly suitable. Examples of suitable peroxides conforming to those requirements are ditertiary butyl peroxide and dicumyl peroxide, the decomposition velocity of which at temperatures below 100° C. is so low that the half-life periods of the peroxide decomposition exceeds 24 hours.

The radical formers are advantageously added in quantities of 1–10 percent by weight to the copolymers and admixed with the latter such as by rolling or kneading. After shaping, the cross-linking is effected by heating the mixture at elevated temperatures ranging from 50° C. up to about 250° C., and preferably between 100 and 200° C. for about 5 to 40 minutes. Fillers can be admixed with the copolymers, whereby a considerable improvement in the mechanical values of the vulcanisates can be produced. Pigments, coloring agents, plasticisers, age resistors, etc., can also be admixed.

The products produced by the present process can be cross-linked to such a degree that, in contrast to the initial materials, they are practically insoluble in organic solvents. They have a substantially improved thermal stability. As one property which is of particular value, it is, however, to be emphasised that the products have a rubber-like elasticity, such as cannot be produced by cross-linking pure polyethylene. In addition, the copolymers have a better compatibility with other synthetic resins and natural and synthetic rubbers. The cross-linked copolymers can be used for many different purposes. For example, they are suitable for the manufacture of moulded articles such as liquid containers, pipes and flexible tubes, as coating materials, for example for the manufacture of heavy electric cables, as anti-corrosion coatings, as white wall surfacings for automobile tyres, for textile coatings, for example for rain-proof clothing and tent materials, etc., the good resistance of the products to atmospheric influences, and more especially to ozone and light, having proved particularly advantageous.

In a further development of this process, it has been found that the properties of the said vulcanisates can be improved if the cross-linking is carried out with radical-forming substances in the presence of small quantities of polymerizable unsaturated organic compounds which contain at least two, and advantageously at least three, non-benzenoid carbon-carbon double bonds, and have a boiling point above 100° C.

Examples of suitable compounds of this nature are: aromatic compounds which contain at least 2 vinyl groups, such for example as divinyl benzene and trivinyl benzene, esters of polyhydric alcohols with olenfinically unsaturated carboxylic acids, such for example as glycol dimethacrylate, esters of polybasic acids with olefinically unsaturated alcohols, such for example as diallyl phthalate, o-silicic acid tetraallyl ester and triallyl phosphate, olefinically unsaturated polyethers, such for example as diallyl and triallyl ethers of glycerine and tetraallyl or hexaallyl ethers of tetramethylol or hexamethylol melamine, and polyurethanes derived from polyisocyanates and olefinically unsaturated alcohols, such for example as the polyurethanes obtained from polyisocyanates and allyl alcohol, olefinically unsaturated polyesters obtained from glycols and olefinically unsaturated dicarboxylic acids, such for example as maleic acid, fumaric acid, triacrylyl perhydro-s-triazine, triallyl cyanurate, or triallyl phosphate. These compounds are advantageously used in quantities of 0.5–20 percent by weight and more especially of 1–10 percent, based on the weight of the copolymers.

Due to the additional use of the polymerizable unsaturated compounds having at least two carbon-carbon double bonds referred to above when carrying out the cross-linking, it is possible substantially to improve the degree of vulcanisation of the vulcanisates.

In the following examples, the parts indicated are parts by weight.

*Example 1*

10,000 cc. of tertiary butyl alcohol and 8 g. of alpha-alpha'-azodiisobutyric acid nitrile dissolved in 2800 cc. of vinyl acetate are placed in an autoclave equipped with a stirrer mechanism and having a capacity of 20 litres, whereupon the atmospheric oxygen is completely removed by flushing with ethylene which is as far as possible free from oxygen. Ethylene is forced into the autoclave until a pressure of 100 atm. is reached, whereupon the contents of the autoclave are quickly heated to 63° C. Thereafter, more ethylene is introduced until a pressure of 300 atm. of ethylene is reached. As soon as the pressure starts to fall, fresh ethylene is added, so that an ethylene pressure of approximately 300 atm. is maintained throughout the entire polymerization period. After a polymerization period of 18 hours, a highly viscous solution has formed, from which 4000 g. of polymer are isolated. The polymer contains 45 percent of incorporated vinyl acetate.

100 parts by weight of this copolymer are mixed with 50 parts by weight of inactive carbon black, in one case without and in another case with 2 parts by weight of dicumyl peroxide, and heated for 30 minutes at 151° C. The products have the following technological values:

|  | A Without dicumyl peroxide | B With 2 percent dicumyl peroxide |
|---|---|---|
| Tensile strength (kg./cm.$^2$) | 14 | 130 |
| Elongation (percent) | 730 | 550 |
| Modulus: |  |  |
| 300 percent | 6 | 40 |
| 500 percent | 9 | 99 |
| Hardness (Shore) at: |  |  |
| 20° C | 47 | 55 |
| 75° C | 3 | 35 |
| Elasticity at: |  |  |
| 20° C | 38 | 42 |
| 75° C | 15 | 32 |
| Permanent elongation, percent | over 100 | 10 |

*Example 2*

The following basic mixtures were prepared from a given copolymer of 55 percent ethylene and 45 percent vinyl acetate:

|  | A | B | C |
|---|---|---|---|
| Polymer | 100 | 100 | 100 |
| Active carbon black | 50 |  |  |
| Inactive carbon black |  | 50 |  |
| Pyrogenically obtained highly active silica |  |  | 15 |

From these basic mixtures, one mixture was produced in each case with 1.2 parts of dicumyl peroxide and one mixture in each case with 1.2 parts of dicumyl peroxide and 3 parts of triallyl cyanurate.

After vulcanising for 60 minutes at 4.0 atm., the following figures were obtained for the tension value at 300 percent elongation and for the compression set after 70 hours at 100° C., which figures clearly show the difference in the degree of vulcanisation of the respective vulcanisates.

|  |  | Tension value, 300 percent, kg./cm.$^2$ | Compression Set, percent |
|---|---|---|---|
| A | Dicumyl peroxide | 82 | 17.5 |
|  | Dicumyl peroxide + triallyl cyanurate | 102 | 4.0 |
| B | Dicumyl peroxide | 90 | 21 |
|  | Dicumyl peroxide + triallyl cyanurate | 123 | 3 |
| C | Dicumyl peroxide | 25 | 34 |
|  | Dicumyl peroxide + triallyl cyanurate | 70 | 9 |

*Example 3*

A copolymer of 65 percent ethylene and 35 percent vinyl acetate gave similar results in the same types of mixture, as will be seen from the following table:

|  |  | Kg./cm.$^2$ | Percent |
|---|---|---|---|
| A | Dicumyl peroxide | 134 | 20 |
|  | Dicumyl peroxide + triallyl cyanurate | 155 | 3 |
| C | Dicumyl peroxide | 48 | 37 |
|  | Dicumyl peroxide + triallyl cyanurate | 102 | 4 |

*Example 4*

From a copolymer consisting of 55 percent ethylene and 45 percent vinyl acetate, the following mixtures were prepared:

|  | D | E |
|---|---|---|
| Polymer | 100 | 100 |
| Pyrogenically obtained highly active silica | 15 | 15 |
| Dicumyl peroxide | 1.2 | 1.2 |
| Glycol dimethacrylate |  | 3 |

After vulcanisation for 30 minutes at 4.0 atm., the following physical values are obtained:

|  | D | E |
|---|---|---|
| Strength (kg./cm.$^2$) | 96 | 139 |
| Elongation (percent) | 700 | 595 |
| Tension value (modulus): |  |  |
| 300 percent | 23 | 46 |
| 500 percent | 46 | 92 |
| Hardness (Shore) at 20° C | 55 | 60 |
| Elasticity at 20° C | 43 | 46 |

*Example 5*

From a polymer consisting of 70 percent ethylene, 15 percent vinyl acetate and 15 percent vinyl alcohol, the following mixtures were prepared:

|  | F | G |
|---|---|---|
| Polymer | 100 | 100 |
| Pyrogenically obtained highly active silica | 15 | 15 |
| Dicumyl peroxide | 1.2 | 1.2 |
| Triallyl cyanurate |  | 3 |

After vulcanising for 30 minutes at 4.0 atm. the following mechanical values are obtained:

|  | F | G |
|---|---|---|
| Strength (kg./cm.$^2$) | 107 | 205 |
| Elongation (percent) | 130 | 300 |
| Tension value 300 percent (kg./cm.$^2$) |  | 188 |
| Shore hardness at: |  |  |
| 20° C | 93 | 95 |
| 75° C | 65 | 81 |
| Elasticity (percent): |  |  |
| at 20° C | 31 | 32 |
| at 75° C | 46 | 55 |

Example 6

A mixture was prepared on the mixing roll from the following components:

100.0 parts by weight of a copolymer of
    55.0 parts by weight of ethylene
    45.0 parts by weight of vinyl propionate (prepared according to Italian Patent No. 584,212)
50.0 parts by weight of inactive carbon black
2.0 parts by weight of di-cumyl peroxide.

Test samples prepared from this mixture were heated in the vulcanization press to 151° C. for 30 minutes (4.0 atm. vapor gauge); the following physical properties were obtained:

Tensile strength (kg./cm.$^2$) _____ 102
Elongation (percent) _____ 410
Modulus at 300 percent elongation (kg./cm.$^2$) ____ 39
Hardness (Shore) at 25° C. _____ 61
Hardness (Shore) at 75° C. _____ 51
Elasticity (percent) _____ 39

Example 7

The following mixture was prepared in an internal mixture:

100.0 parts by weight of a copolymer of
    65.0 parts by weight of ethylene
    35.0 parts by weight of vinylacetate (prepared according to Italian Patent No. 584,212 with a melt viscosity of less than 10 g./10 min. at 190° C.)
30.0 parts by weight of active carbon black
2.0 parts by weight of di-tertiary butylperoxide.

The following physical values were obtained from test samples vulcanized to 151° C. for 30 min.:

Tensile strength (kg./cm.$^2$) _____ 195
Elongation (percent) _____ 500
Modulus at 300 percent elongation (kg./cm.$^2$) ____ 102
Hardness at room temperature _____ 64
Hardness at 75° C. _____ 36
Elasticity (percent) _____ 44
Permanent elongation (percent) _____ 45
Compression set:
    70 hours 100° C. _____ 17.5
    22 hours 150° C. _____ 27.6

Example 8

A mixture was prepared in a mixing roll from the following components:

100.0 parts by weight of a copolymer of
    67.0 parts by weight of ethylene
    33.0 parts by weight of propylene
15.0 parts by weight of pyrogenically obtained silicic acid
1.2 parts by weight of di-cumyl peroxide.

After vulcanizing and molding the product under usual vulcanization conditions, for instance into a tube or a cable coating, elastic products were obtained which are stable to high temperatures and substantially insoluble in organic solvents.

Example 9

The following mixtures were obtained from a copolymer of 80.0 parts by weight of ethylene
    20.0 parts by weight of vinylacetate

|  | H | J |
|---|---|---|
| Polymer | 100.0 | 100.0 |
| Pyrogenically obtained highly active silicic acid | 15.0 | 15.0 |
| Triallyl phosphate |  | 3.0 |
| Di-cumyl peroxide | 2.0 | 2.0 |

After vulcanization at 151° C. for 30 min. the following mechanical values were obtained:

| | | |
|---|---|---|
| Tensile strength (kg./cm.$^2$) | 80 | 175 |
| Elongation (percent) | 150 | 380 |
| Modulus at 300 percent elongation (kg./cm.$^2$) | | 128 |
| Hardness. | | |
|   at 20° C. (Shore) | 83 | 86 |
|   at 75° C. (Shore) | 75 | 84 |
| Elasticity (percent) 20° C | 38 | 44 |

Example 10

The following mixtures were obtained from a copolymer of 70.0 parts by weight of ethylene
    30.0 parts by weight of vinylacetate

|  | K | L |
|---|---|---|
| Polymer | 100.0 | 100.0 |
| Pyrogenically obtained highly active silicic acid | 20.0 | 20.0 |
| Vinyl cyclohexene |  | 3.0 |
| Di-tertiary butylperoxide | 1.5 | 1.5 |

After vulcanization at 4.0 atm. for 30 min. the following mechanical values were obtained:

| | | |
|---|---|---|
| Tensile strength (kg./cm.$^2$) | 90 | 169 |
| Elongation (percent) | 250 | 515 |
| Modulus at 300 percent elongation (kg./cm.$^2$) | 31 | 81 |
| Modulus at 500 percent elongation (kg./cm.$^2$) | 82 | 135 |
| Hardness: | | |
|   at 20° C. (Shore) | 73 | 85 |
|   at 75° C. (Shore) | 38 | 68 |
| Elasticity (percent) 20° C | 31 | 54 |

Example 11

A copolymer of 67.0 parts by weight of ethylene
    33.0 parts by weight of propylene was mixed with 50.0–300.0 parts by weight of semi-active carbon black
2.0 parts by weight of di-cumyl peroxide
3.0 parts by weight of triallyl cyanurate and subsequently vulcanized in the press to 151° C. for 30 min.

In all cases non-fusing products of excellent thermal stability, very good mechanical properties and insolubility in organic solvents were obtained.

What is claimed is:

1. A process for the production of elastomers which comprises heating a mixture consisting essentially of (1) a copolymer of ethylene with 10–60% by weight of a vinyl ester, (2) 1–10% by weight of said copolymer of an organic free radical-forming polymerization catalyst, and (3) 0.5–10% by weight of said copolymer of a monomer having at least two non-conjugated ethylenically unsaturated groups, at a temperature of about 50–250° C.

2. The process of claim 1 wherein said compound (3) is a compound containing at least three allyl groups.

3. The process of claim 2 wherein said copolymer is an ethylene-vinyl acetate copolymer produced by free radical polymerization in a liquid phase containing predominantly tertiary butanol.

4. The process of claim 2 wherein said copolymer is a copolymer of ethylene with 20–50% by weight of a vinyl ester.

5. The process of claim 2 wherein said catalyst is an organic peroxide which has at temperatures up to 100° C. a half-life period of decomposition of more than 24 hours and which decomposes rapidly above that temperature up to 250° C.

6. The process of claim 1 wherein said compound (3) is triallyl cyanurate.

7. The process of claim 1 wherein said compound (3) is triallyl phosphate.

8. A process for the production of elastomers which comprises heating a mixture consisting essentially of (1) a copolymer of ethylene with 10–60% by weight of a vinyl ester, (2) 1–10% by weight of said copolymer of an organic free radical-forming polymerization catalyst, (3) 0.5–10% by weight of said copolymer of a monomer having at least two non-conjugated ethylenically unsaturated groups, and (4) carbon black, at a temperature of about 50–250° C.

References Cited in the file of this patent

UNITED STATES PATENTS

| | | |
|---|---|---|
| 2,155,590 | Garvey | Apr. 25, 1939 |
| 2,455,910 | Alderson | Dec. 14, 1948 |
| 2,539,377 | Staudinger et al. | Jan. 23, 1951 |
| 2,609,353 | Rubens et al. | Sept. 2, 1952 |
| 2,628,214 | Pinkney et al. | Feb. 10, 1953 |
| 2,826,570 | Ivett | Mar. 11, 1958 |
| 2,888,424 | Precopio et al. | May 26, 1959 |

FOREIGN PATENTS

| | | |
|---|---|---|
| 564,040 | Canada | Sept. 30, 1958 |
| 597,833 | Great Britain | Feb. 4, 1948 |
| 760,104 | Great Britain | Oct. 31, 1956 |